Figure 1:
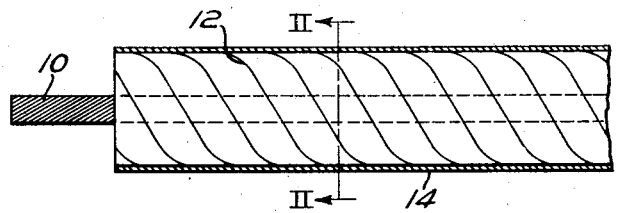

May 16, 1939.  J. G. FORD ET AL  2,158,281

FIREPROOF CABLE COMPOUND

Filed March 15, 1935

WITNESSES:

INVENTORS
James G. Ford and
Charles F. Hill.
BY
ATTORNEY

Patented May 16, 1939

2,158,281

UNITED STATES PATENT OFFICE 2,158,281

FIREPROOF CABLE COMPOUND

James G. Ford, Forest Hills, and Charles F. Hill, Edgewood, Pa., assignors to Westinghouse Electric & Manufacturing Company, East Pittsburgh, Pa., a corporation of Pennsylvania Application March 15, 1935, Serial No. 11,258

4 Claims. (Cl. 260—4)

Our invention relates to insulating compounds of fireproof nature and it has particular relation to fireproof compounds of plastic character which are suitable for impregnating the insulation of electrical cables of the fabric clad as well as of the metallic sheathed type.

Such cables are extensively utilized in present day low voltage network and other power distribution circuits many of which are installed in congested city office buildings and in other locations where hazards to public safety and operating efficiency require that the dielectric compound utilized to impregnate the cable insulation be fire and explosion proof and that the gaseous decomposition products thereof be non-explosive.

There have been developed fire-proof insulating fluids which are relatively satisfactory for the impregnation of cables which are capable of being completely sealed. Likewise fireproof mixtures capable of treating the fabric coverings of rubber-insulated cables to reduce their tendency to burn when subjected to externally produced high temperatures have for some time been known. These, however, are incapable of penetrating the full insulation depth and they thus do not render the cable completely fireproof nor do they prevent it from developing combustible gases upon overheating.

None of these previously known mixtures, furthermore, can be successfully applied as an insulation saturant for the ordinary fabric-clad cables nor are they entirely satisfactory in many respects for use with metal-clad cables. There thus exists a distinct need for fireproof compounds having special and heretofore unattainable characteristics, and it is to the provision of such mixtures that the present invention is directed.

One object of our invention is to produce fireproof insulation-impregnating mixtures generally suitable for fabric-insulated cables of both the fabric-sheathed and the metallic sheathed type.

Another object is to provide such impregnating mixtures which, over the ordinary operating temperature range, are plastic in nature and thus incapable of flowing out of the cable insulation.

A further object is to provide mixtures of the above-named character which at temperatures of 100° C. or above are sufficiently plastic as not to run out of an unsheathed cable and at temperatures of 0° C. or below retain sufficient flexibility to allow the impregnated insulation to be bent without injury.

A still further object is to improve the waterproofness of insulating compounds of the named class.

In accordance with our invention we provide fireproof compounds for insulation impregnating service which are plastic rather than fluid. The physical properties of these new materials are capable of such variation as to render them equally suitable for impregnating the paper, cloth or other insulation which surrounds the conductor in cables not only of the metallic sheathed type but also those of the fabric-clad type which to prevent an outflow require an impregnator of unusual stiffness.

Our new compounds are, however, sufficiently fluid at the high impregnating temperatures (130° to 150° C.) to thoroughly penetrate the insulation. Within the range of cable operating temperatures (the upper limit of which seldom exceeds 100° C. and the lower limit of which seldom falls below —20° C.) these materials become plastic and hence are incapable of flowing out of the insulation. Even at the named low temperatures they retain flexibility sufficient to permit the cable to be bent, as during installation, without danger of insulation breakage. Furthermore they do not flow along the cable as a result of temperature changes and thus more effectively prevent the formation of objectionable gas pockets or voids. All of the above named advantages accrue from the property of being plastic rather than liquid as are all comparable prior art materials.

Our invention is based upon the discovery that certain of the already-developed fireproof insulating materials, such as those of the halogenated-base variety, may be blended with other materials to produce plastic compounds having the mechanical, electrical, fireproof and other characteristics desired for cable impregnating service. Polymerized styrene, certain soluble synthetic resins and natural gums, certain rubber resins, tricresyl phosphate, and trichlorbenzene constitute a partial list of materials with which the halogenated or other fireproof base compounds may be blended. Polymerized styrene is particularly effective in imparting a peculiar rubber-like property. By employing highly halogenated base materials, we are readily able to maintain the final chlorine content above the substantially 50% by weight needed to preserve fireproofness.

Figure 2:
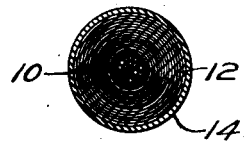

For a further explanation of our invention, reference will be made to the accompanying drawing, in which Figure 1 is a view partially in section and partially in elevation of an electrical cable for the impregnation of the insulation of which the compounds of our invention are especially well suited, and Fig. 2 is a view taken on the line II—II of Fig. 1 showing a cross section of the cable structure.

Referring to the drawing, the cable there illustrated comprises a centrally disposed electrical conductor 10 about which is wrapped a plurality of layers of fibrous or other insulating material 12. Surrounding this is an outer sheath 14 which in a fabric-clad cable is of heavy cloth and in a metal-sheathed cable is of lead.

To raise the insulating effectiveness of the material 12, and also to prevent an absorption of moisture by and a formation of gas pockets therein, it is highly desirable to thoroughly impregnate it with insulating medium. The previously known forms of impregnating compounds, both flammable and inflammable, have, particularly in the case of fabric-clad cables, been generally unsatisfactory for the subject application.

By providing an insulating compound which, over the entire range of ordinary operating temperatures is plastic in nature instead of having the usual fluid properties common to a liquid we are able to overcome the above-named objectionable characteristics. The illustrated insulating material 12 may be in the form of a plurality of layers of paper, cloth, asbestos and mineral or glass wool. The proposed impregnating compound may be treated with the oxides of magnesium, titanium, zinc or aluminum and certain other comparable substances or the paper or other base insulation may be filled with such inorganic material before impregnation.

As before pointed out, we produce our improved impregnating compound by adding plasticizing material to certain basic fireproof solid or semi-solid compounds. For such plasticizing service, the following materials are found to be especially suitable: polymerized styrene, the resins of cumarone, tricresyl phosphate, triethanolamine, diethyl phthalate, dibutyl phthalate, trichlorbenzene and refined coal-tar distillate having a boiling range of 300° to 380° C. Rubber resins, such as chlorinated rubber, the reaction product between rubber, stannic chloride, ferric chloride or chlorostannic acid and gutta percha are also suitable and when used as plasticizers afford the further advantage of improving the water proofness and resiliency of the resulting insulating compound. In practice polymerized styrene proves especially effective in imparting to the compound the desired peculiar rubber-like property.

Preferably the basic ingredients are of a sufficiently highly halogenated character to so counteract the effects of dilution by the combustible plasticizer as to maintain the chlorine content of the final mixture at not less than about 50% by weight, the quantity required to preserve fireproofness. The result is a fireproof material having the plasticity, electrical, water resistance and other characteristics desired in an insulation impregnator for the ordinary form of fabric clad and lead covered cable.

An example of a fireproof mixture compounded in accordance with our invention which constitutes a fireproof insulating compound highly satisfactory for impregnating cables of the fabric-sheathed variety is given by the below-presented Formula I:

61.5% chlorinated naphthalene (54% to 65% chlorine)
31.0% chlorinated diphenyl or the oxide thereof (50% to 65% chlorine)
7.5% polymerized styrene This insulating mixture is plastic like chewing gum at room temperature, still plastic at −20° C. and does not flow appreciably at 100° C. If less plasticity is desired the quantity of polymerized styrene may be increased which, of course, makes it desirable that higher chlorinated base materials be used. In this and the formulae which follow, the chlorinated naphthalene and diphenyl compounds may be either in the pitch or the purified form. The stated ingredient proportions are in percentages by weight.

Another mixture not quite so plastic at ordinary temperatures but which has been found to function very well as a cable insulation impregnator is given by Formula II:

60% chlorinated naphthalene (54% to 65% chlorine)
30% chlorinated diphenyl or the oxide thereof (54% to 65% chlorine)
10% polymerized styrene A cable made by wrapping a copper conductor with cotton cloth impregnated with this material to an insulation thickness of $\tfrac{1}{16}$ inch has withstood 1,000 volts continuously when submerged in salt water for a period of 9 days. And a cable similarly constructed exhibited an insulation breakdown value of from 22,000 volts to 25,000 volts when immersed in salt water.

Other mixtures also found satisfactory for the named application are presented by Formulae III to IV, inclusive.

*Formula III*

50% chlorinated naphthalene (54% to 65% chlorine)
25% chlorinated diphenyl or the oxide thereof (54% to 69% chlorine)
25% polymerized styrene

*Formula IV*

33⅓% chlorinated naphthalene (54% to 65% chlorine
33⅓% chlorinated diphenyl or the oxide thereof (54% to 69% chlorine)
33⅓% polymerized styrene

*Formula V*

66⅔% chlorinated diphenyl or the oxide thereof (54% to 69% chlorine)
33⅓% polymerized styrene

*Formula VI*

50% chlorinated diphenyl or the oxide thereof (54% to 68% chlorine)
50% polymerized styrene Due to the high plasticizer (polymerized styrene) content of the last listed mixtures particularly, they are not strictly fireproof but they do possess physical properties which make them desirable for such applications as mica bonds, etc.

Comparable benefits may also be realized by a similar addition to the halogenated base materials listed in the above presented formulae of other soluble synthetic resins, natural gums and the like which, when dissolved, impart to the mixture the desired plastic characteristics. Thus, in the above mixtures, the polymerized styrene may be partially replaced by the previously mentioned tricresyl phosphate and the resins of cumarone, although at a slight sacrifice of rubber-like characteristics. Refined coal-tar distillate having a boiling point range of from 300° to 380° C. is of similar effectiveness.

Other plasticizing agents such as trichlorbenzene, triethanolamine, diethyl phthalate or dibutyl phthalate, when added in quantities up to 10% are comparably beneficial for increasing plasticity at low operating temperatures. As already mentioned rubber resins, including chlorinated rubber, the reaction product between rubber, stannic chloride, ferric chloride or chlorstannic acid and gutta percha may be utilized to additionally improve the water proofness and resilience of the mixtures.

The compounds of the first-presented formulae particularly have the stiffness required for the impregnation of fabric-clad and other cables so constructed as to permit radial penetration into the insulation along the entire cable length. In the case of metal-clad cables, however, impregnation must be effected from the ends only, and this means that at the high impregnating temperatures the compound must be capable of very ready flow. In Formula VII we present the ingredients of such a special mixture.

Formula VII 40.8% chlorinated naphthalene (50% to 65% chlorine)
40.8% chlorinated diphenyl or the oxide thereof (60% to 65% chlorine)
10.2% tricresyl phosphate
4.1% polymerized styrene
4.1% trichlorbenzene Nor are the benefits which accrue from the named additions of plasticizing and other modifying agents restricted to changes in the viscosity characteristics inasmuch as the additions also serve to minimize the evaporation losses when the compound is exposed to the atmosphere. The resulting mixtures are, therefore, substantially more stable and of correspondingly greater utility in a wide variety of applications of which cable impregnation is but one.

The above presented compounds make ideal fire-proof insulation when used in conjunction with non-combustible filling material such as asbestos, mineral and glass wool and oxides of magnesium, titanium, zinc and aluminum. Thus, when the insulation 12 of the illustrated cable is comprised of such a material, an impregnation therewith by the improved compounds of our invention renders the cable absolutely fireproof. As has already been indicated furthermore, when the cable covering 14 is of fabric, rubber or other conventional material used in the past in such constructions, the fireproof characteristics of the impregnating compound are also effective to render the covering material non-combustible.

By giving attention to the power factor characteristics of the mixture and by thoroughly drying the materials to be impregnated, the above stated mixtures can also be used in the building up of insulation for high voltage apparatus.

It is desired to further emphasize that the secret of the abnormal physical properties of the insulating mixtures which we have disclosed is the dissolved plasticizing material which converts the semi-solid base into plastic form. Such fireproof plastic material, as has already been pointed out, does not become liquid over the entire range of ordinary operating temperatures and is thus incapable of the usual flow. In this respect it is clearly distinguishable from other similar impregnating materials which have in the past been proposed, all of which within our knowledge possess liquid or fluid type properties and have very steep viscosity curves. The characteristics of the straight halogenated compounds are typical of these prior art materials. Our invention on the other hand utilizes plasticizing materials which so modify the viscosity-temperature characteristics as to convert the mixture into a plastic over the ordinary range of operating temperatures.

Although we have shown and described certain specific embodiments of our invention, we are fully aware that many modifications thereof are possible. Our invention, therefore, is not to be restricted except insofar as is necessitated by the prior art and by the scope of the appended claims.

We claim as our invention:

1. A fireproof dielectric compound comprising from 50 to 61.50% of chlorinated naphthalene containing 54 to 65% chlorine, from 25 to 31% of a chlorinated diphenyl material containing 54 to 69% chlorine, and from 7.5 to 25% of polymerized styrene, said compound being plastic within the temperature range of from about −0° C. to about 100° C. so that in a cable impregnated therewith the compound remains sufficiently flexible at the lower temperature to be bent without injury and sufficiently plastic at the higher temperature as not to run out of the cable.

2. A fireproof dielectric compound comprising substantially 40.8% chlorinated naphthalene containing from 50% to 65% chlorine, 40.8% chlorinated diphenyl or the oxide thereof containing 60% to 65% chlorine, 10.2% of tricresyl phosphate, 4.1% of polymerized styrene and 4.1% trichlorbenzene.

3. A fireproof dielectric compound of plastic character at ordinary temperatures comprising chlorinated naphthalene containing 50% to 65% chlorine and a chlorinated diphenyl compound containing 50% to 65% chlorine in admixture with a lesser quantity of polymerized styrene, tricresyl phosphate and trichlorbenzene, the chlorine content being not less than 50% by weight, said compound being plastic within the range from about −20° C. to about 100° C. so that in a cable impregnated therewith the compound remains sufficiently flexible at the lower temperature to be bent without injury and sufficiently plastic at the higher temperature as not to run out of the cable.

4. A fireproof dielectric compound of plastic character at ordinary temperatures comprising chlorinated naphthalene containing 50% to 65% chlorine and a chlorinated diphenyl compound containing 50% to 65% chlorine in admixture with a lesser quantity of polymerized styrene one of tricresyl phosphate and heavy coal tar distillate, and a rubber resin from the group consisting of chlorinated rubber, the reaction product between rubber and stannic chloride, ferric chloride, or chlorstannic acid and gutta percha, the chlorine content being not less than 50% by weight, said compound being plastic within the range from about −20° C. to about 100° C. so that in a cable impregnated therewith the compound remains sufficiently flexible at the lower temperature to be bent without injury and sufficiently plastic at the higher temperature as not to run out of the cable.

JAMES G. FORD.
CHARLES F. HILL.